Figures 1, 2:
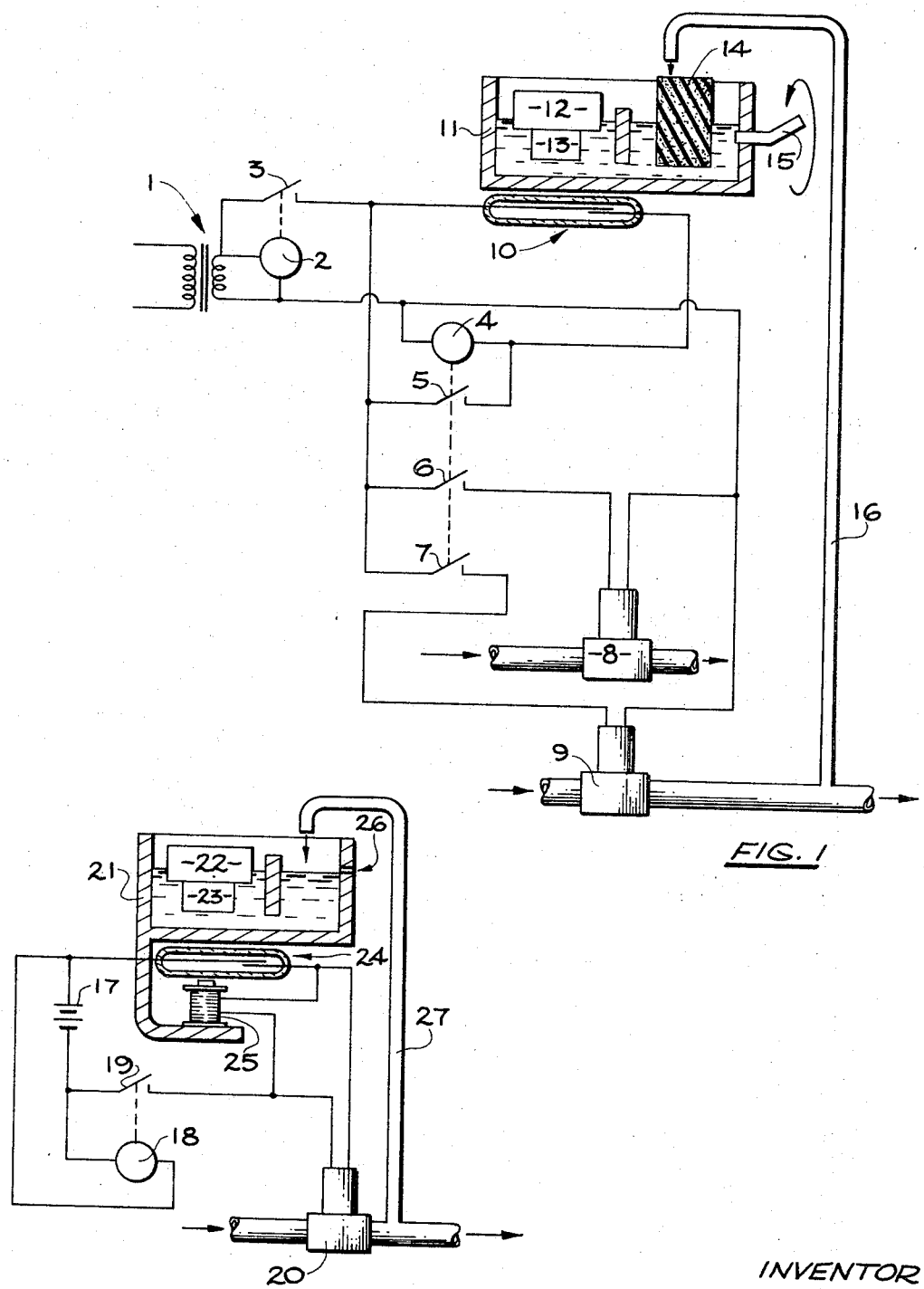

INVENTOR
Raymond W. Hoeppel

United States Patent Office 3,339,842
Patented Sept. 5, 1967

3,339,842
SYSTEMS FOR WATER CONTROL
Raymond W. Hoeppel, P.O. Box 5,
Oak View, Calif. 93022
Substituted for abandoned application Ser. No. 430,323, Feb. 4, 1965. This application Dec. 5, 1966, Ser. No. 607,112
15 Claims. (Cl. 239—65)

This invention relates to method and systems for automatically controlling the intermittent flow of water with respect to the natural evaporative tendency of the atmosphere.

Automatic control systems usually require the use of a time switch, and where used for irrigation systems, do not take into account the actual needs of the plants for water. This invention is an improvement over the water control system described in U.S. Patent 3,174,496; which latter system teaches the application of water in accordance with plant needs, by utilizing the natural evaporation rate as a control for the frequency of water applications, so that irrigations occurred more frequently on hot dry days than on wet days. In this latter system, the water valve was controlled by water collected in a container, the valve opening when the water was diminished by evaporation and closing when a portion of the water passing through the valve was added to the container. It was thus necessary to provide for a very slow filling of the container during the period of the irrigation in order that this period would not be too short. This slow filling required the use of small orifice apertures in the water feed line, which often became plugged with salts or products of corrosion, thus causing unpredictable changes in the period of irrigation and even complete failure of the system.

In the present improvement, changes in apparatus and method of operation obviate the need for small restrictive orifices or water dividers, thus reducing or eliminating those problems caused by obstructions.

Another advantage of the new system is the greater ease of control and regulation of the actual period of irrigation, to a high degree of accuracy, by means of simple manual adjustment. The new system is more adaptable to the control of more than one valve than the former systems, inasmuch as it permits the control of valves in a successive manner so that only one valve of the system is in operation at one time, thus maintaining pressure at a higher level than when all valves are operated simultaneously. Also, the regulation of the period between irrigations is more readily and more accurately adjusted than with the former system.

One object of the invention therefore is to provide a water control system that does not require the accurate regulation of minute flows of water and which varies the frequency of water application in relation to the evaporation rate.

Other objects are to provide a water control system that is stable in operation, readily adaptable to accurate adjustment of the period of irrigation, adaptable to sequential operation of more than one valve and relatively immune to faulty operation due to the presence of obstructive foreign material in the water line.

Another object is to provide means for adjustment of the period between irrigations by either a regulation of the evaporative rate or by a regulation of the amount of water held in the container.

These objects are attained by utilizing a water control valve that is in turn controlled by the amount of water present in a container from which water may evaporate. A portion of the water passing through the valve is transferred to the container and any excess water above that required to close the valve is discarded by overflow means. Provision is made to hold the valve open for a definite pre-established period of time after the container has filled to the level where it would normally close the valve, this time corresponding to the period of irrigation, after which the valve is allowed to close. Upon evaporation of at least a portion of the water in the container, the valve again opens and the above process is repeated.

Figure 3:
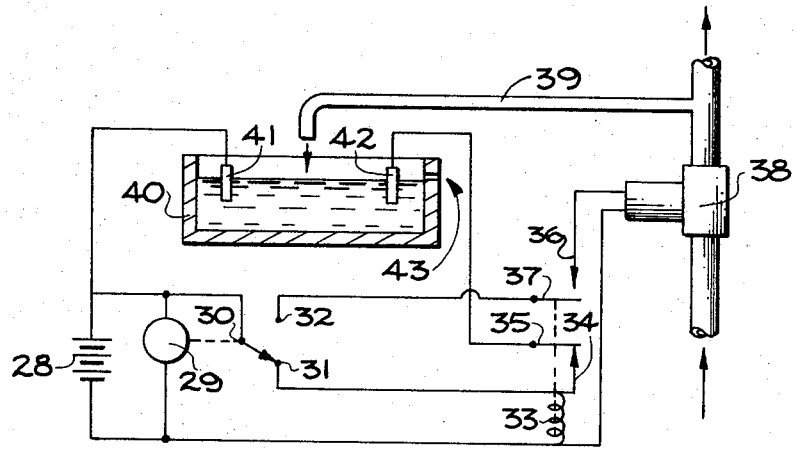
Figure 4:
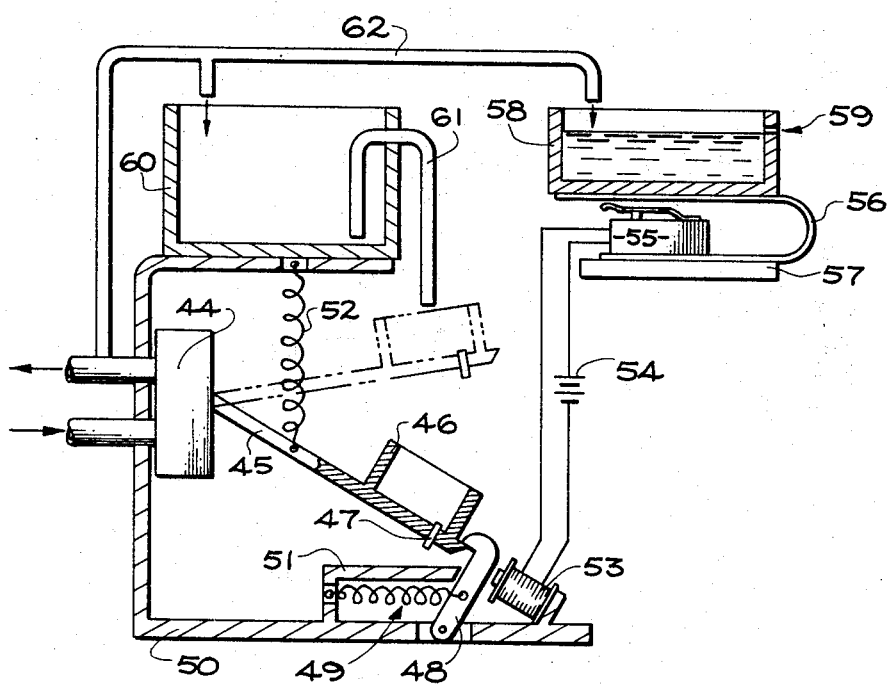

In the accompanying drawings, illustrative of presently desired embodiments of the invention, but intended only as examples and not as limitations, FIGURE 1 shows a complete water control system utilizing two solenoid valves, a multiple control timer and a master control time switch, with details of an evaporative control switch shown in cross section. FIGURE 2 shows an evaporative control switch in cross section in another embodiment of the invention utilizing a solenoid valve and a time switch controlled solenoid, all being shown in a complete water system. FIGURE 3 shows the use of a conductive type evaporative switch, in cross section, in a complete water control system, including a solenoid valve, a time switch and a relay. FIGURE 4 shows a complete water control system in cross section utilizing a toggle valve, an evaporative switch and a hydraulic timer.

FIGURE 1 illustrates a complete water control system incorporating two sequentially operated, normally closed solenoid valves 8 and 9, which are in turn controlled by a repeat cycle motor-driven cam programmer comprising motor 4 and cam switches 5, 6 and 7. Switch 5 is adjusted to be open only during a very small portion of the cycle of rotation, it being closed over the major part of the cam travel. Switches 6 and 7 are closed over any portion of the cam travel when switch 5 is closed, and these switches must be open when switch 5 is open. If sequential operation of the valves is desired, switch 6 must be closed when switch 7 is open and visa versa.

Power is derived from an alternating current line via the isolation transformer 1, which serves to energize motor 4 and the valves, and which constantly actuates motor 2, which in turn drives repeat time cycle switch 3. Time switch 3 is adjusted to remain closed for any period of time greater than the period of rotation of the timing cams turned by motor 4, and may optionally be set to allow the irrigation system to operate only during one selected period of the day. Time switch 3 is not essential to the water control system but does permit deactuation of the system over any portion of the day that is selected, where this is desired.

The evaporative float switch comprises a nonmagnetic container 11, a float 12, to which is attached a permanent magnet 13 and a magnetic reed switch 10, the switch being attached to the bottom of the container in an area that is within the flux range of the magnet. When the magnet approaches switch 10, the switch closes, and when it moves away from switch 10, the switch opens. Thus a differential movement of the magnet with respect to the switch is necessary to open and close the switch. It is necessary that switch 10 open before water passes through overflow 15 and that it close before water has completely been removed from the container. A sponge 14 dips in the water within the container to accelerate the rate of evaporation, but this sponge is not necessary where lower evaporation rates are permissible. An essential part of the float switch is the overflow 15, which in this instance can be turned about its axis to vary the level of the water in the float chamber when at its highest point.

When the control system is not operating the solenoid valve, motor 4 is not turning and switches 5, 6, 7, and 10 are open. Upon evaporation of some of the water in container 11, float 12 descends, bringing magnet 13 closer to switch 10 until at some point, switch 10 will snap closed. Then, when switch 3 closes, current passes through switches 3 and 10 to the motor and it begins to turn. After a short time switch 5 is closed by the motor driven cam. Somewhat later, switch 6 closes, thus opening the normally closed solenoid valve 8, and after a predetermined irrigation period, switch 6 opens, closing valve 8. Shortly thereafter, if the valves are to be operated in sequence, switch 7 closes, thus opening valve 9. A portion of the water passing through valve 9 is bypassed via pipe 16 into container 11, causing the float and magnet to rise and move away from switch 10, thus eventually opening switch 10. However, motor 4 continues to turn inasmuch as switch 5, which parallels switch 10, is still closed. After the second selected period of irrigation, switch 7 opens, closing valve 9. Shortly thereafter, switch 5 opens, stopping motor 4. At some time later, motor 2 opens switch 3, thus preventing any further irrigations until switch 3 is again closed. Normally switch 3 closes once every 24 hours and the period of rotation of the cams driven by motor 4 is shorter, perhaps one or two hours in length, dependent upon the length of irrigation and the number of valves controlled.

It is obvious that as little as one valve may be controlled by this system, or, by adding more cams and switches, more than two valves may be controlled. Other types of timers other than motor driven cam timers may be used, such as electronic types or spring wound types, as long as they perform the function of the timers described.

Also, the overflow from container 11 need not be adjustable, especially if the period between irrigations is to remain constant with respect to a given evaporative rate. This period between irrigations also can be adjusted by increasing the surface area of evaporation such as by inserting a sponge 14 in the container; or by partially covering the container the surface area may be reduced, thus increasing the time between irrigations. A discrete overflow conductor need not be used if the height of the container is reduced to a point where the excess will overflow its upper rim. Another method for adjusting the level of the water retained in the container is to provide a number of ports in the side of the container at different levels and to plug the lower ports until the desired overflow point is reached.

In FIGURE 2 is shown another embodiment of the invention using the same type of evaporative float switch as previously described. In this instance, however, the sponge was not used and the overflow line was not made adjustable so that the maximum level remains constant. Also a solenoid 25 was placed in the vicinity of switch 24. As this switch operates in exactly the same manner as above, a complete description of its mode of operation will not be repeated, but the added effect of the solenoid will be described.

Time switch 19 is operated by a continuous running motor 18 in a repeat cycle fashion. Normally switch 19 closes once every 24 hours for the period of the desired irrigation, but it may operate oftener or less frequently than the 24 hour period. Power for the motor and solenoid valve is furnished by battery 17.

As long as switch 24 is open, valve 20 cannot open, even though switch 19 closes. As evaporation from container 21 occurs, float 22 and attached magnet 23 are lowered until finally switch 24 is closed. Then when switch 19 later closes, or if switch 19 is already closed, solenoid valve 20 opens as current flows through switches 19 and 24, and simultaneously, solenoid 25 becomes actuated inasmuch as it parallels the valve. A portion of the water passing through the valve is diverted, via pipe 27, into container 21, causing float 22 and magnet 23 to rise, thus reducing the flux at switch 24 so that it would normally open, but switch 24 does not open inasmuch as solenoid 25 holds it closed. Excess water is discarded via overflow 26. Then, when the time switch 19 opens, both the solenoid 25 and valve 20 are deactuated and water stops flowing. On evaporation of some of the water in the container the above cycle is repeated.

It will be recognized that this system is adaptable to multiple valve control. For instance, motor 18 could drive a multiple cam timer having switches to sequentially operate several valves and with one switch to keep solenoid 25 actuated during the entire irrigation cycle, in the manner as is illustrated in FIGURE 1.

FIGURE 3 illustrates one method of operation of an evaporative conductive switch in a water control system. Here, container 40 has two electrodes, 41 and 42, dipping into the water that is collected, and an overflow 43, to remove excess water. Water in the container must contact both electrodes before any water flows through the overflow. A repeat cycle cam switch is operated by motor 29 to perform a double throw single pole switching action using contacts 30, 31 and 32. Contacts 30 and 31 open and 30 and 32 simultaneously close for definite intervals, the latter contacts remaining closed only for the duration of the irrigation period. Relay 33 is a double throw type with contacts 34 and 35 closed and 37 and 36 open when the relay is energized as shown in the figure. A battery, 28, supplies the power for the motor, relay and valve.

As long as water is not flowing through the solenoid valve 38, relay 33 is energized via contacts 30 and 31 or via alternate contacts 41 and 42. At intervals, motor 29 opens contacts 30 and 31 and closes contacts 30 and 32. When this occurs, relay 33 remains energized as long as contacts 41 and 42 are dipping in the water, and thus the solenoid valve remains closed. However, if contacts 41 and 42 are not both in contact with the water when contacts 30 and 31 open, no current flows through the water and relay 33 falls out when contacts 30 and 31 open, thus opening contacts 34 and 35 and closing contacts 36 and 37. Then, when contacts 30 and 32 close, the solenoid valve is energized and opened via contacts 30 and 32 and contacts 36 and 37. Some of the downstream water is then bypassed via conductor 39 into container 40 and contacts 40 and 41 are again connected by a water film. Excess water overflows via conductor 43. However, when conductivity is again re-established between contacts 41 and 42, relay 33 still does not pull in because contacts 34 and 35 are still open.

When, at the end of the pre-selected irrigation period, contacts 30 and 32 are opened and contacts 30 and 31 are closed by motor 29, valve 38 closes and relay 33 is reactuated via contacts 30 and 31, thus opening contacts 36 and 37 and closing contacts 34 and 35 which latter contacts lock in the relay, until water evaporating from the container restarts the cycle. Multiple valves could be controlled with this system by utilizing a multiple switch timer that is cycled via contacts 30 and 32 and contacts 36 and 37, the individual switches on the timer controlling the valves.

In FIGURE 4 is shown a water control system utilizing a hydraulic timer. The evaporative switch used is operated by a change in weight of the collected water instead of by its change in volume as in previous examples, although other evaporative controls, such as in previous embodiments, may be used in this embodiment. This evaporative switch comprises the container 58 having an overflow 59, the container being mounted on a spring 56 which in turn is attached to a base 57. Also mounted on this base is a snap switch 55 that is spring biased to be normally closed when the water in the container is considerably below the overflow point 59. When, then the water level rises to a point just below the overflow 59, the increased weight of the water overcomes some of the bias of the spring 56, thus depressing the lever on switch 55 and opening its contacts which in turn deactivates solenoid 53. It is necessary that switch 55 open before any water passes through the overflow 59, and that a differential amount of water in container 58 is required to open and close the switch.

The flow of water is controlled by toggle valve 44, which need not be a snap acting type. This valve is mounted on framework 50 and is spring biased to an open position by spring 52, which exerts force on toggle arm 45. Attached to the toggle arm is container 46 which has a small discharge port 47 at its lower extremity. Also movably mounted to the framework is a pawl 48 which engages with toggle arm 45 when the valve is in a downward position and thus holds the valve closed. A spring 49 biases the pawl towards the toggle arm. A solenoid 53 is mounted on the framework in such position that it will attract the pawl when energized and thus disengage the pawl from the toggle arm, thus freeing the arm 45. The battery 54 serves as a source of power for the solenoid.

A portion of the water flowing through the toggle valve is transferred via conductor 62 to container 58 of the evaporative switch, and to container 60, which latter container is preferably mounted above container 46. An automatic syphon 61 rapidly empties the water in container 60 into container 46 when the level of water in the container reaches the uppermost position of the syphon. The rate of flow of water into container 60 governs the length of time the valve remains open during the irrigation period.

The water control system of FIGURE 4 operates in the following manner. When water evaporates from container 58, it becomes lighter in weight and spring 56 moves the container upward, at the same time moving the lever arm of switch 55 upward until the switch closes, thus actuating solenoid 53 which in turn attracts pawl 48, disengaging it from the toggle arm 45 and allowing spring 52 to pull the arm upward and thus open valve 44. A portion of the water passing through the valve then begins to slowly flow into containers 58 and 60. Very soon thereafter, container 58 gains enough weight to depress switch 55 and thus it opens the switch and de-energizes solenoid 53, which releases pawl 48 which then comes to rest against member 51. Excess water discharges through overflow 59. Water continues to flow into container 60 until it reaches the top of syphon 61, at which time it is rapidly discharged into container 46 as the syphon automatically starts. The weight of the added water in container 46 overcomes the bias of spring 52 and depresses toggle arm 45 thus closing valve 44. When arm 45 is depressed it is locked in place by pawl 48 so that the valve remains in a closed position. Water in container 46 slowly drains away via orifice 47 until it is empty and the valve remains closed until the above cycle repeats itself again.

The rate of flow of water into container 60 is adjusted so that the water level in the container will reach the top of the syphon at the end of the pre-established period of irrigation. In order to avoid very low rates of flow through tube 62, container 60 is made quite large so that it will not fill too quickly to the top of the syphon and thus cut short the irrigation period. It is important that the amount of water discharged from container 60 be in excess of the amount needed to operate the toggle valve and also it is important that the rate of discharge of water from container 60, via the syphon, be greater than the rate of discharge of the water from container 46 via orifice 47. Since container 60 will normally hold more water than container 46, the excess water, beyond that handled by orifice 47, will flow over the top of the container.

It is obvious that valves other than toggle valves may be adapted to the device of FIGURE 4 as long as the weight of the water-filled container 46 can be made to operate the valve. Other methods of holding the valve closed can be employed instead of the pawl-solenoid system.

In any of the embodiments, water passing through the valve may be transferred to the evaporative control means by other than pipes or conductors. For instance, when the water passing through the valve is dispersed by sprinkler, the container of the evaporative control may be placed in such position that it will intercept some of the water emerging from the sprinkler.

What is claimed is:

1. A water control system comprising in combination: at least one container for collecting water, at least one container being open to the atmosphere, said water evaporating from said container when the relative humidity of the atmosphere is below 100 percent; at least one valve for controlling the flow of water; valve control means responsive to a first given quantity of water in said container for closing said valve and responsive to a second given quantity of water in said container, less than said first given quantity, for opening said valve, said valve opening upon evaporation of water from said container, from said first given quantity to said second given quantity; timing means automatically responsive to said valve control means upon the opening of said valve to hold said valve open for a predetermined period of time, said valve remaining open for said period of time even though said container is refilled to said first given quantity of water prior to the expiration of said period; means to limit the maximum quantity of water collected by said container to a third given quantity, said third given quantity being at least equal to said first given quantity; and means for transferring at least a portion of the water passing through said valve into said container at a rate fast enough to fill said container with said first given quantity of water before the end of said pre-determined period of time.

2. A water control system comprising in combination: an evaporative switch, said switch comprising a container open to the atmosphere for holding water, said water evaporating from said container when the relative humidity of the atmosphere is below 100 percent, and an electric switch responsive to the quantity of water held in said container, said switch performing a switching action when the quantity of water in said container decreases by evaporation from a first given amount to a second given smaller amount, said switch also performing a switching action when said quantity of water increases from said second given amount to said first given amount; at least one electrically operated valve for controlling the flow of water, said valve being responsive to said evaporative switch, said valve opening when the quantity of water in said container is reduced by evaporation to said second given amount from said first given amount, said valve normally closing when the quantity of water in said container is increased from said second given amount to said first given amount; means to limit the maximum quantity of water held by said container to an amount at least equal to said first given amount; timing means to hold said valve open for a predetermined period of time even though the water held by said container has increased to said first given amount during said period of time; and means to transfer a portion of the water passing through said valve into said container, said transfer occurring at a rate great enough to fill said container with said first given amount of water before the end of said predetermined period of time.

3. A water control system according to claim 1, including means to vary the amount of said third given quantity of water.

4. A water control system according to claim 1, including means to vary the rate of evaporation of water from said container.

5. A water control system according to claim 1, including means to limit the operation of said valve to a predetermined period of the day.

6. A water control system according to claim 2 including means to vary said maximum amount of water collected in said container.

7. A water control system according to claim 2 including means to vary the rate of evaporation of water from said container.

8. A water control system according to claim 2 including timing means to limit operation of said valve to predetermined period of the day.

9. A water control system according to claim 2 wherein a multiplicity of valves are used, said valves being controlled by said timing means to operate in sequence.

10. A water control system comprising in combination; an evaporative float switch, said switch comprising a container open to the atmosphere for holding water, said water evaporating from said container when the relative humidity of the atmosphere is below 100 percent, a float, a permanent magnet attached to said float, a magnetic reed switch located in a fixed position with respect to said container in flux coupling relationship with said switch, said reed switch moving to a first given position upon a reduction of water in said container by evaporation from a first given amount to a second given amount, said reed switch moving to a second given position upon an increase in water in said container from said second given amount to said first given amount; at least one electrically operated valve for controlling the flow of water, said valve being responsive to said switch; a recycling timing means responsive to said reed switch, said timing means operating for a predetermined period of time, said timing means being actuated by said reed switch when it is in its first given position, said timing means being deactuated on completion of its cycle only if said reed switch is in its second given position, said timing means controlling at least one time switch for controlling said valve; means to limit the amount of water held by said container to an amount at least equal to said first given amount; and means to transfer a portion of the water passing through said valve into said container.

11. A water control system according to claim 10 including means to vary the maximum amount of water held by said container.

12. A water control system according to claim 10 including means to vary the rate of evaporation of water from said container.

13. A water control system according to claim 10 including additional timing means to limit operation of said valve to a predetermined period of the day.

14. A water control system according to claim 10 wherein a multiplicity of valves is sequentially controlled by a multiplicity of switches, said switches being controlled by said timing means.

15. A water control system comprising in combination: a first given container for collecting a first given amount of water over a predetermined time interval; a second given container for collecting a second given amount of water; a third given container open to the atmosphere for collecting a third given amount of water; a valve for controlling the flow of water, said valve being responsive to the amounts of water in said second given and third given containers, said valve opening when said third given amount of water has been reduced in amount by evaporation, said valve normally remaining closed when said third given amount of water has been collected, said valve normally opening when said second given amount of water has been reduced below said second given amount and closing when said second given amount of water has been collected in said second given container; means to limit the amount of water collected in said third given container to at least third given amount; means to transfer water from said first given container to said second given container, said transfer occurring when said first given amount has been collected; means to remove water from said second given container after said valve has been closed; timing means to keep said valve open through said third given amount of water has been collected in said third given container, said timing means comprising said first given container, a water inlet into said first given container and an automatic outlet from said first given container, said outlet being responsive to the amount of water in said container; means to hold valve closed even though the water in said second given container has been reduced below said second given amount, said means being responsive to the amount of water in said third container; and means for transferring a portion of the water passing through said valve into said first and third containers, the transfer into said third container occurring at a rate fast enough to fill said third container with said third given amount of water before water flows into second given container and closes said valve.

References Cited

UNITED STATES PATENTS

| | | | |
|---|---|---|---|
| 2,116,415 | 5/1938 | Shenton | 200—84.3 |
| 2,284,158 | 5/1942 | Lewis | 239—64 |
| 2,335,716 | 11/1943 | Weeden | 239—65 |
| 2,495,149 | 1/1950 | Taylor | 200—84.3 |
| 2,674,490 | 4/1954 | Richards | 239—66 |
| 2,766,070 | 10/1956 | Park | 239—65 |
| 2,776,860 | 1/1957 | Griffis | 239—65 |
| 2,965,117 | 12/1960 | Gallacher | 239—65 |
| 2,991,938 | 7/1961 | Norcross | 239—65 |
| 3,174,496 | 3/1965 | Hoeppel | 137—78 |

EVERETT W. KIRBY, *Primary Examiner.*